Oct. 17, 1950 W. G. FORKEY 2,526,341
TRAVELING ROLLER AND RADIAL BEARING
Filed Jan. 27, 1948
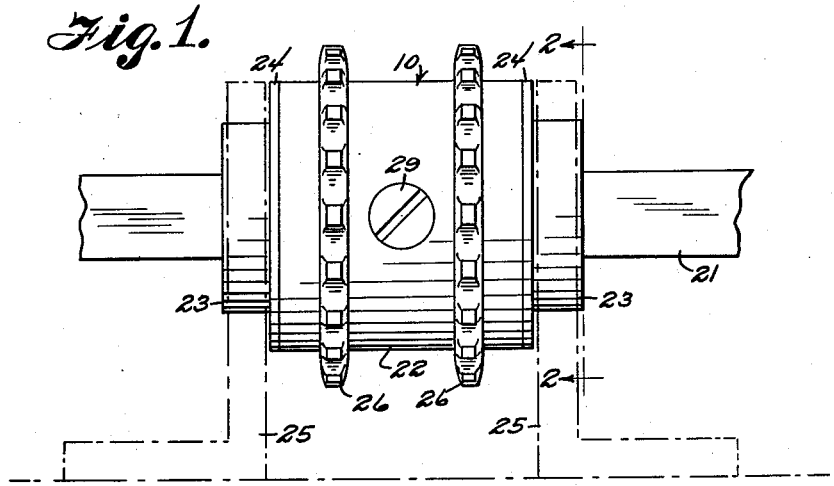
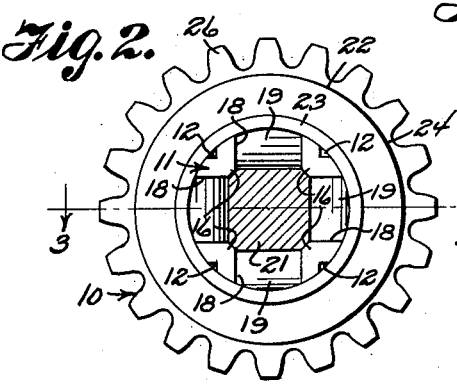
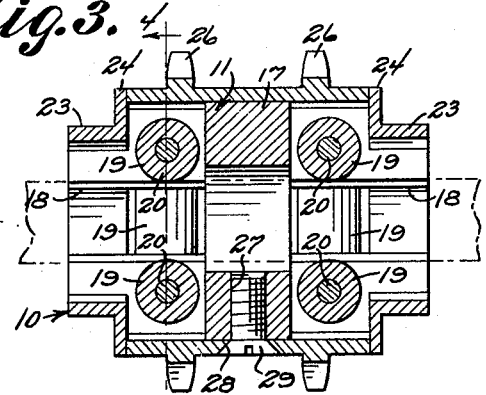
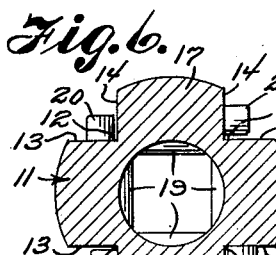
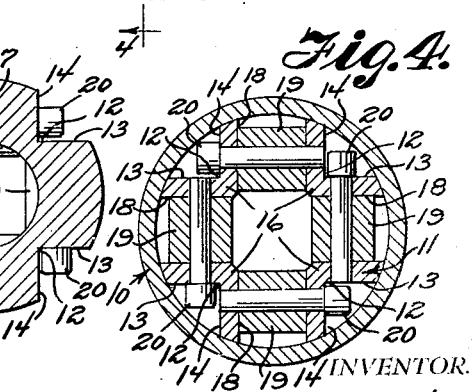
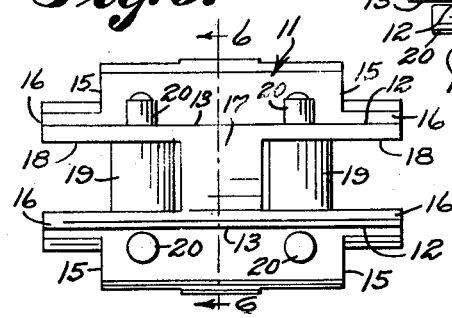
INVENTOR.
Willard George Forkey
BY Victor J. Evans & Co.
ATTORNEYS Patented Oct. 17, 1950

2,526,341

UNITED STATES PATENT OFFICE 2,526,341

TRAVELING ROLLER AND RADIAL BEARING

Willard G. Forkey, Augusta, Ga.

Application January 27, 1948, Serial No. 4,523

4 Claims. (Cl. 308—1)

This invention relates to a traveling and radial bearing for use on square shafts.

An object of this invention is to provide a bearing of this type that, at high speed, will operate as a traveling bearing on a square shaft, and at moderate speed, as a radial bearing on the same shaft.

Another object of this invention is to provide a bearing of this type, in which rollers are mounted on supporting pins, that extend at right angles to the longitudinal line of the square shaft, on which the bearing is mounted.

With the above and other objects and advantages in view, the invention consists of the novel details of construction, arrangement and combination of parts more fully hereinafter described, claimed and illustrated in the accompanying drawing in which:

Figure 1 is an elevational view of an embodiment of the invention;

Figure 2 is an end elevational view looking in the direction of the arrows on the line 2—2 of Figure 1;

Figure 3 is a sectional view on the line 3—3 of Figure 2;

Figure 4 is a sectional view on the line 4—4 of Figure 3;

Figure 5 is a side, elevational view of the core of the bearing and

Figure 6 is a sectional view on the line 6—6 of Figure 5.

Referring more in detail to the drawing, the reference numeral 10 is used to designate a bearing embodying the invention.

The bearing 10 comprises a core 11 which, when first formed, is tubular in cross-section. The core is provided with four longitudinally extending grooves 12, which are L-shaped in cross section. The horizontal portions 13 extend in parallel spaced horizontal planes, and the vertical portions 14 extend in parallel spaced vertical planes, as shown in Figures 4 and 6, it being understood that during rotation of the core, the planes of the portion will change according to the rotation of the core.

The ends of the portions 13 and 14 are inset at 15 to provide the V-shaped projections or bosses 16. The portion 17 of the core, not provided with the grooves 12, is then provided with opposed inwardly directed recesses 18, in which are placed the rollers 19. The pin shafts 20 mounting the rollers for rotation thereon, have their axes extending at right angles to the longitudinal line of the square shaft 21. The pin shafts, however, are parallel to the sides of the shaft 21, so that the shaft, when inserted into the core, will have each one of its sides engaged by the rollers.

The pins 20 extend through the portions 14 and 13 of the grooves 12, as shown in Figure 4. A tubular hub 22 is then slid onto the core and the curved wall of the core uncut by the grooves, as well as the portion of the wall remaining after the grooves have been formed, has a tight, sliding fit with the interior surface of the hub 22.

An arbor 23 is then slid onto the bosses 16, at each end of the core, and each arbor has a tight, sliding fit with the bosses. An annular ring shaped flange 24 on the rear edge of the arbor engages the outer edges of the hub 22 and the flange and hub are of the same circumferential size.

The arbors 23 become the shaft end of the bearing, and rotate in stationary supporting bearings, as shown, by dotted lines at 25, Figure 1.

Thus the arbors retain the hub in place, since the bearings 25 prevent outward movement of the arbors.

The supporting bearings 25 may be made fixed to, or a part of, a carriage which travels along the shaft 21.

The hub 22 may be provided with spaced parallel sprockets 26, so that while the bearing is travelling along the shaft, the shaft can be turning the bearing to drive sprocket chains engaged with the sprockets 26.

To cause the hub and core to rotate simultaneously, the core is provided with a threaded bore 27, and the hub with a countersunk opening 28, so that when the screw 29 is in the position shown, the hub and core rotate simultaneously.

The insertion of the screw makes a driving and travelling roller bearing. When the screw is removed, an idler bearing is provided, since the sliding fit of the arbor and hub is also of sufficient clearance to provide a moving fit.

There has thus been provided a travelling roller and radial bearing which is capable of dual operation as a travelling and driving bearing, or as an idler bearing.

It is believed that from the foregoing description, the structure and operation of the bearing will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A bearing of the type described, comprising a hub, a tubular core in said hub, pins carried by said core at right angles to the longitudinal line of the core, recesses in the core about the pins and rollers rotatably mounted on said pins, outwardly extending projections on said core, arbors positioned on said projections and said arbors are adapted to have a moving fit with said projections and said arbors at their inner edges are provided with an annular flange of the same size as said hub.

2. The invention as in claim 1, wherein said core is provided with longitudinal extending grooves to permit the insertion of the pins in the core and to set the pins inwardly of the outer surface of the core.

3. The invention as in claim 1, wherein the hub is tubular in cross-section and is placed on said core so that a moving clearance is provided between the core and hub.

4. The invention as in claim 1, wherein means is provided for fixing said hub to said core, to provide a travelling, driving pulley, and the removal of said means will provide an idler pulley.

WILLARD GEO. FORKEY.

REFERENCES CITED

The following references are of record in the file of this patent:

UNITED STATES PATENTS

| Number | Name | Date |
|---|---|---|
| 163,083 | Knock | May 11, 1875 |
| 796,230 | Lehman | Aug. 1, 1905 |
| 2,144,156 | Johnson | Jan. 17, 1939 |
| 2,169,264 | Long | Aug. 15, 1939 |